(12) United States Patent
Fleig et al.

(10) Patent No.: US 7,864,507 B2
(45) Date of Patent: Jan. 4, 2011

(54) CAPACITORS WITH LOW EQUIVALENT SERIES RESISTANCE

(75) Inventors: Patrick Franz Fleig, Albuquerque, NM (US); Charles D. E. Lakeman, Albuquerque, NM (US); Mark Fuge, Albuquerque, NM (US)

(73) Assignee: TPL, Inc., Albuquerque, NM (US)

( * ) Notice: Subject to any disclaimer, the term of this patent is extended or adjusted under 35 U.S.C. 154(b) by 619 days.

(21) Appl. No.: 11/850,633

(22) Filed: Sep. 5, 2007

(65) Prior Publication Data

US 2009/0168305 A1 Jul. 2, 2009

Related U.S. Application Data (60) Provisional application No. 60/824,749, filed on Sep. 6, 2006.

(51) Int. Cl.
*H01G 9/00* (2006.01)

(52) U.S. Cl. ............... 361/502; 361/503; 361/504; 361/509; 361/512; 361/523

(58) Field of Classification Search ............... 361/502, 361/503–504, 508–512, 516–519, 523–529
See application file for complete search history.

(56) References Cited

U.S. PATENT DOCUMENTS

| | | | |
|---|---|---|---|
| 2,800,616 A | 7/1957 | Becker | |
| 2,998,550 A | 8/1961 | Collins et al. | |
| 3,648,126 A | 3/1972 | Boos et al. | |
| 3,787,240 A | 1/1974 | Gillman et al. | |
| 3,925,098 A | 12/1975 | Saunders et al. | |
| 3,969,149 A | 7/1976 | Thomas et al. | |
| 4,012,562 A | 3/1977 | Saunders | |
| 4,438,481 A | 3/1984 | Phillips et al. | |
| 4,562,511 A | 12/1985 | Nishino et al. | |
| 4,597,028 A | 6/1986 | Yoshida et al. | |
| 4,709,303 A | 11/1987 | Fujiwara et al. | |
| 4,725,927 A | 2/1988 | Morimoto et al. | |
| 4,842,963 A | 6/1989 | Ross, Jr. | |
| 5,041,946 A | 8/1991 | Iseki | |
| 5,065,286 A | 11/1991 | Kurabayashi et al. | |

(Continued)

FOREIGN PATENT DOCUMENTS

TW 529230 4/2003

OTHER PUBLICATIONS

Boyle, Timothy J. et al., "REchargeable Lithium Battery Cathodes. Nonaqueous Synthesis, Characterization, and Electrochemical Properties of LiCoO2", *Chem. Mater.* vol. 10, No. 8 1998, 2270-2276.

(Continued)

*Primary Examiner*—Nguyen T Ha
(74) *Attorney, Agent, or Firm*—Philip D. Askenazy; Peacock Myers, P.C.

(57) ABSTRACT

An electric double layer capacitor (EDLC) in a coin or button cell configuration having low equivalent series resistance (ESR). The capacitor comprises mesh or other porous metal that is attached via conducting adhesive to one or both the current collectors. The mesh is embedded into the surface of the adjacent electrode, thereby reducing the interfacial resistance between the electrode and the current collector, thus reducing the ESR of the capacitor.

10 Claims, 7 Drawing Sheets

U.S. PATENT DOCUMENTS

| | | | |
|---|---|---|---|
| 5,072,335 A | 12/1991 | Kurabayashi et al. | |
| 5,072,336 A | 12/1991 | Kurabayashi et al. | |
| 5,072,337 A | 12/1991 | Kurabayashi et al. | |
| 5,080,963 A | 1/1992 | Tatarchuk et al. | |
| 5,099,398 A | 3/1992 | Kurabayashi et al. | |
| 5,102,745 A | 4/1992 | Tatarchuk et al. | |
| 5,115,378 A * | 5/1992 | Tsuchiya et al. | 361/502 |
| 5,121,301 A | 6/1992 | Kurabayashi et al. | |
| 5,136,472 A | 8/1992 | Tsuchiya et al. | |
| 5,142,451 A | 8/1992 | Kurabayashi et al. | |
| 5,150,283 A | 9/1992 | Yoshida et al. | |
| 5,151,848 A | 9/1992 | Finello | |
| 5,304,330 A | 4/1994 | Tatarchuk et al. | |
| 5,319,518 A * | 6/1994 | Blood | 361/502 |
| 5,338,625 A | 8/1994 | Bates et al. | |
| 5,426,561 A | 6/1995 | Yen et al. | |
| 5,429,893 A | 7/1995 | Thomas | |
| 5,512,147 A | 4/1996 | Bates et al. | |
| 5,567,210 A | 10/1996 | Bates et al. | |
| 5,587,259 A | 12/1996 | Dopp et al. | |
| 5,606,213 A | 2/1997 | Kherani et al. | |
| 5,621,607 A | 4/1997 | Farahmandi et al. | |
| 5,659,457 A | 8/1997 | Lian et al. | |
| 5,777,428 A | 7/1998 | Farahmandi et al. | |
| 5,796,574 A * | 8/1998 | Saito et al. | 361/502 |
| 5,862,035 A | 1/1999 | Farahmandi et al. | |
| 5,872,698 A | 2/1999 | Bai et al. | |
| 5,907,472 A | 5/1999 | Farahmandi et al. | |
| 5,928,808 A | 7/1999 | Eshraghi | |
| 5,989,300 A | 11/1999 | Eshraghi | |
| 6,011,379 A | 1/2000 | Singh et al. | |
| 6,059,847 A | 5/2000 | Farahmandi et al. | |
| D427,144 S | 6/2000 | Buckle | |
| 6,094,788 A | 8/2000 | Farahmandi et al. | |
| 6,197,450 B1 | 3/2001 | Nathan et al. | |
| 6,233,135 B1 | 5/2001 | Farahmandi et al. | |
| 6,264,709 B1 | 7/2001 | Yoon et al. | |
| 6,265,851 B1 | 7/2001 | Brien et al. | |
| 6,310,789 B1 | 10/2001 | Nebrigic et al. | |
| 6,315,568 B1 | 11/2001 | Hull et al. | |
| 6,340,787 B1 | 1/2002 | Simeray et al. | |
| 6,370,046 B1 | 4/2002 | Nebrigic et al. | |
| 6,395,423 B1 | 5/2002 | Kawakami et al. | |
| 6,402,796 B1 | 6/2002 | Johnson | |
| 6,449,139 B1 | 9/2002 | Farhmandi et al. | |
| 6,451,073 B1 | 9/2002 | Farahmandi et al. | |
| 6,456,988 B1 | 9/2002 | Singh et al. | |
| 6,468,690 B1 | 10/2002 | Barker et al. | |
| 6,479,919 B1 | 11/2002 | Aselage et al. | |
| 6,522,522 B2 * | 2/2003 | Yu et al. | 361/502 |
| 6,558,836 B1 | 5/2003 | Whitacre et al. | |
| 6,585,152 B2 | 7/2003 | Farahmandi et al. | |
| 6,586,133 B1 | 7/2003 | Teeters et al. | |
| 6,610,440 B1 | 8/2003 | LaFollette et al. | |
| 6,615,074 B2 | 9/2003 | Mickle et al. | |
| 6,621,687 B2 | 9/2003 | Lewis, Jr. et al. | |
| 6,627,252 B1 | 9/2003 | Nanjundiah et al. | |
| 6,646,415 B1 | 11/2003 | Nebrigic et al. | |
| 6,671,165 B1 * | 12/2003 | Nakazawa et al. | 361/502 |
| 6,737,830 B2 | 5/2004 | Bean et al. | |
| 6,804,108 B2 | 10/2004 | Nanjundiah et al. | |
| 6,807,853 B2 | 10/2004 | Adamson et al. | |
| 6,841,456 B2 | 1/2005 | Hersee et al. | |
| 6,842,330 B2 | 1/2005 | Farahmandi et al. | |
| 6,858,970 B2 | 2/2005 | Malkin et al. | |
| 6,861,170 B2 | 3/2005 | Lewis, Jr. et al. | |
| 6,894,460 B2 | 5/2005 | Clingman | |
| 6,914,412 B2 | 7/2005 | Wang et al. | |
| 6,936,994 B1 | 8/2005 | Gimlan | |
| 6,951,456 B2 | 10/2005 | Cohen et al. | |
| 6,954,025 B2 | 10/2005 | Nishida et al. | |
| 6,995,496 B1 | 2/2006 | Hagood, IV et al. | |
| 7,081,693 B2 | 7/2006 | Hamel et al. | |
| 7,090,706 B2 | 8/2006 | Farahmandi et al. | |
| 7,116,545 B2 | 10/2006 | Farahmandi et al. | |
| 2001/0033501 A1 | 10/2001 | Nebrigic | |
| 2001/0033971 A1 | 10/2001 | Zhao et al. | |
| 2002/0084188 A1 | 7/2002 | Tran et al. | |
| 2003/0099884 A1 | 5/2003 | Chiang et al. | |
| 2003/0118884 A1 | 6/2003 | Hampden-Smith et al. | |
| 2003/0152815 A1 | 8/2003 | LaFollette et al. | |
| 2003/0185742 A1 | 10/2003 | Watanabe et al. | |
| 2004/0002002 A1 | 1/2004 | Mizuta et al. | |
| 2004/0072683 A1 | 4/2004 | Kodas et al. | |
| 2004/0074784 A1 | 4/2004 | Anex et al. | |
| 2004/0078662 A1 | 4/2004 | Hamel et al. | |
| 2004/0161640 A1 | 8/2004 | Salot | |
| 2004/0261743 A1 | 12/2004 | Kelling et al. | |
| 2005/0012434 A1 | 1/2005 | Pizzochero et al. | |
| 2005/0082942 A1 | 4/2005 | Shirley | |
| 2005/0115600 A1 | 6/2005 | DeSteese et al. | |
| 2005/0115601 A1 | 6/2005 | Olsen et al. | |
| 2005/0146220 A1 | 7/2005 | Hamel et al. | |
| 2005/0164085 A1 | 7/2005 | Bofinger et al. | |
| 2005/0225213 A1 | 10/2005 | Richards et al. | |
| 2005/0285728 A1 | 12/2005 | Tyndall | |
| 2006/0133003 A1 | 6/2006 | Kular et al. | |
| 2006/0220843 A1 | 10/2006 | Broad et al. | |
| 2006/0226844 A1 | 10/2006 | Broad | |
| 2006/0226990 A1 | 10/2006 | Broad et al. | |
| 2006/0229086 A1 | 10/2006 | Broad et al. | |
| 2007/0182362 A1 | 8/2007 | Trainor et al. | |

OTHER PUBLICATIONS

Jackman, Rebecca J. et al., "Fabrication of Submicrometer Features on Curved Substrates by Microcontact Printing", *Science* vol. 269 Aug. 4, 1995, 664-665.

Jeon, N. L. et al., "Patterning of dielectric oxide thin layers by microcontact printing of self-assembled monolayers", *Journal of Materials Research* vol. 10, No. 12 Dec. 1995, 2996-2999.

Kumar, Amit et al., "Patterning Self-Assembled Monolayers: Applications in Materials Science", *Langmuir* vol. 10, American Chemical Society 1994, 1498-1511.

Linden, David et al., *Handbook of Batteries* 3rd Edition, McGraw-Hill, Inc. 2002, 35.20-35.23, 35.71-35.74.

Pique, A. et al., "Laser Direct Writing of Microbatteries for Integrated Power Electronics", *SPIE's LASE '2001* Jan. 20-26, 2001.

Salmon, L. G. et al., "Fabrication of rechargeable microbatteries for microelectrochemical system (MEMS) applications", *Proceedings of the Intersociety Energy Conversion Engineering Conference, 33rd* 1998.

Greenwood, J. A. et al., "Constriction resistance and the real area of contact", *Brit. J. Appl. Phys.* vol. 17 1966, 1621-1632.

Jiang, Xiaofan et al., "Perpetual Environmentally Powered Sensor Networks", *In Proccedings of IPSN/SPOTS*, Los Angeles, CA., Apr. 25-27, 2005, Apr. 25, 2005.

Polastre, Joseph et al., "Telos: Fourth Generation WSN Platform", *TinyOS Technology Exchange II* Feb. 11, 2005, 1-12.

* cited by examiner

Top View

Side Cut Away View

FIG. 6

SW = Strand Width
LWD = Long Way of the Diamond

FIG. 7

CAPACITORS WITH LOW EQUIVALENT SERIES RESISTANCE

CROSS-REFERENCE TO RELATED APPLICATIONS

This application claims the benefit of the filing of U.S. Provisional Patent Application Ser. No. 60/824,749, entitled "Electric Double Layer Capacitors Having Low Equivalent Series Resistance", filed on Sep. 6, 2006, and the specification thereof is incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract Nos. W31P4Q-04-C-R346 awarded by DARPA, FA8201-04-C-0086 and FA8650-05-C-2613 awarded by AFRL, and NNL06AA06C awarded by NASA.

BACKGROUND OF THE INVENTION

1. Field of the Invention (Technical Field)

The present invention is related to capacitors having low equivalent series resistance.

2. Background Art

Note that the following discussion refers to a number of publications and references. Discussion of such publications herein is given for more complete background of the scientific principles and is not to be construed as an admission that such publications are prior art for patentability determination purposes.

Wireless sensors and networks of wireless sensors will be used to 1) monitor the structural health of buildings, bridges and aircraft, etc.; 2) monitor the environment such as in domestic and commercial buildings, and military and homeland security installations; and 3) control industrial processes for increased autonomy, as well as for other tasks. These systems will find use in factory automation, process and environmental control, security, medicine, and condition-based maintenance, as well as in defense applications and intelligence gathering. Widespread use of wireless sensors will improve safety, increase security, lower heating, ventilation and cooling (HVAC) costs, and increase manufacturing efficiency.

Such wireless sensor systems will typically: 1) require numerous individual devices (known as nodes or motes) to provide comprehensive monitoring capability; 2) be located in inaccessible places and 3) require long intervals between scheduled maintenance. Periodic maintenance, such as replacing batteries, would clearly increase operating costs (often to prohibitive levels), and could be inconvenient, at best, if it required interruption of a continuous process. For some remote, hostile, or inaccessible locations, any maintenance may be impossible to perform. In the immediate future, energy management and improved battery technologies may mitigate some of these issues, but in the long term there is clearly a need to develop an energy source that can last years with little or no maintenance.

Miniaturized turbines and micro-fuel cells have been proposed as means of meeting long term energy delivery needs for wireless devices. While these systems exploit the high energy density of hydrocarbon fuels, for example, these systems are inherently limited by the need for a means of storing and delivering a consistent fuel supply, as well as advanced thermal management to safely remove waste heat. These challenges can be overcome; however, the plumbing and additional system engineering (also known as the balance of plant) adds considerably to the overall size and complexity of such systems.

There are additional challenges with micro-fuel cells. Most types are intended for hydrogen fuel, as protons are the simplest ion to send through the electrolyte. As hydrogen is not readily available, other fuels (e.g., hydrocarbons, methanol or formic acid, or natural gas) can be reformed with steam at high temperature (600° C.) to yield hydrogen and CO. These reformers again add engineering complexity and require extensive insulation for both safety and efficient operation. Furthermore, reported data for micro-fuel cells indicate maximum peak power densities on the order of 50 $mW/cm^2$ but with a duration of less than 100 ms. These challenges ensure that combustion and micro-fuel cell power systems will be unable to meet the volumetric energy and power densities needed for severely volume-constrained applications.

Energy harvesters that garner ambient environmental energy (such as light, vibrations, etc.) and convert it to electrical energy are attractive solutions for wireless sensors as they do not need to be replaced, recharged or refueled. Of course, they are they do not function in the absence of ambient energy (analogous to solar cells at night), and so an energy harvesting power supply must be designed to include some kind of energy storage that can provide back-up power in such situations.

Storage of the energy generated is usually accomplished using conventional capacitors, which have very limited energy storage capability ($E=½CV^2$, where the capacitance, C, is on the order of a few hundred microfarads at most, and V=3-5V). This approach leaves the system vulnerable to interruptions in the ambient energy source. Although batteries and or supercapacitors have been proposed as alternative storage devices, they have not been used successfully in the past. Conventional battery chargers, for example, will not operate at the low power levels delivered by energy harvesters, and, besides, even in they could, they would waste too much of the input energy. Further, no existing system discloses the use of optimum energy storage elements for different functions (e.g. back-up power, pulse power, etc.).

Finally, a major challenge that faces wireless sensor nodes is the asymmetry of the power demands of sensing, processing, communication and sleep functions—on the order of four orders of magnitude. Because communication functions draw relatively high power levels (typically from tens to a few hundred milliwatts), wireless sensor nodes are designed to communicate infrequently (for example, once a minute to once an hour), reverting to a low-power sleep state to preserve battery life. In order to meet high power communications loads, the usual approach is to design a power source large enough to handle the highest power load. Unfortunately, energy harvesting devices and batteries typically have low power densities, and so power sources are typically oversized for most of the life of the system.

There is, therefore, a need for a simple and compact system which combines energy generation via harvesting of ambient energy sources with energy storage to provide back-up power, and deliver high power pulses as needed.

Electric double layer capacitors (EDLCs) typically comprise two porous electrodes that are electronically isolated from each other by a porous separator. Both the separator and the electrodes are impregnated with an electrolytic solution. This allows ionic current to flow between the electrodes while preventing electronic current from shorting the cell. External connection to the electrodes is made via metallic current collectors. When an electric potential is applied across the two electrodes in a double layer capacitor, ionic current flows due to the attraction of anions to the positive electrode and cations to the negative electrode. Energy is stored at the interface between the electrodes and the electrolyte in the so-called Electric Double Layer. This is accomplished by absorption of the charge species themselves or by realignment of the dipoles of the solvent molecule. The absorbed charge is held in the region by the opposite charges in the solid electrode.

The use of carbon electrodes in electrochemical capacitors is a preferred feature of this technology because carbon has a low atomic weight and carbon electrodes can be fabricated with very high surface areas. As capacitance, C, is proportional to the surface area, A, and inversely proportional to the dielectric thickness, d, (i.e., $C=\in A/d$, where $\in$ is the permittivity), EDLCs can realize very high capacitance values (from approximately 100 mF up to approximately 3000F). Fabrication of double layer capacitors with carbon electrodes is well known in the art; see U.S. Pat. Nos. 2,800,616, and 3,648,126.

A major problem in many carbon electrode capacitors, including double layer capacitors, is that the performance of the capacitor is often limited because of the high internal resistance of the carbon electrodes. This high internal resistance may be due to several factors, including the contact resistance of the electrodes with a current collector, the intrinsic resistance of the electrode due to internal carbon-carbon contacts, the resistance of the electrolyte solution and the resistance due to the separator. This high resistance translates to large ohmic losses in the capacitor during the charging and discharge phases, which losses further adversely affect the characteristic RC time constant of the capacitor and interfere with its ability to be efficiently charged and/or discharged in a short period of time. There is thus a need in the art for lowering the internal resistance, and hence the time constant, of double layer capacitors.

So that supercapacitors can deliver their energy quickly (that is, at high power), for example pulsed power delivery, it is important that they have a low equivalent series resistance (ESR) to minimize the voltage drop that occurs with high currents. The greater the ESR the greater the voltage drop will be when a load is applied to the charged capacitor. The voltage drop under load is critical if the circuit that is being powered can only operate above a certain threshold voltage. If the voltage under load of the EDLC drops below that threshold operating voltage of the electronic circuit it will not operate correctly if at all. Therefore EDLC devices with low ESR are desirable.

Several factors affect the ESR of an EDLC device including the interfacial contact resistance between the electrode and the current collector, interfacial charge transfer mechanisms between the electrolyte and the electrode, the interfacial contact resistance of the electrode and the separator, the contact resistance of the particles that make up an electrode, the effective bulk resistivity of the electrode, and the conductivity of the electrolyte and how it moves through the separator and electrodes.

There are four materials considerations that can help reduce the ESR of a supercapacitor.

The separator is a porous, electronically insulating membrane designed to allow ionic transfer but electrically separate the carbon electrodes. Because the mobility of ions ($\mu$) through this membrane is restricted, the conductivity is reduced.

The nature of the electrolyte, including chemical species (z), and concentration (n) affects the ESR. Furthermore, the movement of electrolyte ions in the tortuous interparticle porosity in the electrodes is also restricted, and so the nature of the pore distribution in the electrodes can also affect ESR values.

The activated carbon electrodes provide the means of charge transfer from the electrolyte-electrode interface to the current collector. The intrinsic resistivity of carbon and the particle-particle contact resistance contribute to this component.

The interface between the carbon electrodes and the current collectors is important. It is well known that the contact resistance between two materials with resistivity values $\rho_1$ and $\rho_2$ is:

$$R = (\rho_1 + \rho_2)\left(\frac{1}{4\pi a} + \frac{3\pi}{32nl}\right)$$

where n is the number of contacting asperities, a is the average radius of contacting asperities and 2l is the average center to center distance between the asperities [Greenwood, J. A., *Br. J. Appl. Phys.*, 17, 1621-1632, (1966)]. Therefore, to minimize the contact resistance between two given materials, one must maximize n, 2l and a.

Various fabrication techniques for reducing the internal resistance of carbon composite electrodes have been disclosed over the recent years. For example, Yoshida et al. (U.S. Pat. No. 5,150,283) disclose a method of fabricating a aluminum/carbon composite electrode by depositing carbon powder and other electrical conductivity-improving agents on an aluminum substrate. Another related approach is disclosed in U.S. Pat. No. 4,597,028 (Yoshida et al.) which teaches that the incorporation of metals such as aluminum into carbon fiber electrodes can be accomplished through weaving metallic fibers into carbon fiber preforms. U.S. Pat. No. 4,562,511, (Nishino et al.) describes yet another approach where the carbon fiber is dipped into an aqueous solution such that a layer of a conductive metal oxide, and preferably a transition metal oxide, is formed in the pores of the carbon fibers. Nishino et al. also discloses the formation of metal oxides, such as tin oxide or indium oxide by vapor deposition. Still another related method is disclosed in U.S. Pat. Nos. 5,102, 745, 5,304,330, and 5,080,963 (Tatarchuk et al.). These disclosures demonstrate that metal fibers can be interwoven with the carbon preform and sintered to create a structurally stable conductive matrix which may be used as a composite electrode. The Tatarchuk et al. patents also teach a process that reduces the electrical resistance in the composite electrode by reducing the number of carbon-carbon contacts, which current must flow through to reach the metal conductor. This approach works well if stainless steel or nickel fibers are used as the metal. However, this approach has not been successful when aluminum fibers are used because of the formation of aluminum carbide during the sintering or heating of the composite electrode.

The use of aluminum in fabrication processes of double layer capacitors is important because aluminum is the optimum metal in terms of cost, availability and performance. For example, with an aluminum/carbon composite electrode, in a double layer capacitor with a nonaqueous electrolyte, it is quite possible to achieve an operating voltage approaching 3.0 volts. However, with nickel or stainless steel in lieu of aluminum, the operating voltage must be reduced to less than 2.0 volts. Other metals, including noble metals, such as platinum or silver, or transition metals such as titanium or tantalum, may also be used up to 3.0V in non-aqueous systems with similar improvements.

Related designs of double layer capacitors are also discussed in U.S. Pat. No. 4,438,481, issued to Phillips, et al.; U.S. Pat. No. 4,597,028 issued to Yoshida, et al.; U.S. Pat. No. 4,709,303 issued to Fujiwara, et al.; U.S. Pat. No. 4,725,927, issued to Morimoto; and U.S. Pat. No. 5,136,472, issued to Tsuchiya, et al. Another area of great concern in the fabrication of double layer capacitors is concerned with the method of fabricating the current collector plate and adhering the current collector plate to the electrode. This is important because the interface between the electrode and the current collector plate is another source of internal resistance of the double layer capacitor. The Nishino et al. patent (U.S. Pat. No. 4,562,511) suggests plasma spraying of molten metals such as aluminum onto one side of the polarizable electrode thereby forming an appropriate layer which, if thick enough, acts as the current collector. This patent further considers alternative techniques for bonding and/or forming the current collector including arc-spraying, vacuum deposition, sputtering, non-electrolytic plating, and use of conductive paints. The Tatarchuk et al. patents (U.S. Pat. Nos. 5,102,745, 5,304, 330, and 5,080,963) show the bonding of a metal foil current collector to the electrode by sinter bonding the metal foil to the electrode element. U.S. Pat. No. 5,142,451 (Kurabayashi et al.) discloses a method of bonding of the current collector to the electrode by a hot curing process such that the material of the current collectors enter the pores of the electrode elements. U.S. Pat. No. 5,099,398 (Kurabayashi et al.) discloses a method of bonding of the current collector to the electrode by chemically bonding a thin film collector such that some of the material of the current collectors enter the pores of the electrode elements. This patent further discloses some other conventional methods of bonding the current collector to the electrode including the use of electrically conducting adhesives and bonding under pressure and heat. Still other related art concerned with the method of fabricating and adhering current collector plates can be found in U.S. Pat. Nos. 5,065, 286; 5,072,335; 5,072,336; 5,072,337; and 5,121,301 issued to Kurabayashi et al.

Carbon cloth provides a flexible electrode. However, it has a large amount of void volume due to the nature of the weave. It also tends to shed conductive lint and unravel at the edges. This can lead to a high incidence of short circuits during cell assembly. In addition, obtaining a low resistance electrical contact to the cloth requires special techniques. Farahmandi et al. (U.S. Pat. Nos. 7,116,545, 7,090,706, 6,842,330, 6,804, 108, 6,627,252, 6,585,152, 6,451,073, 6,449,139, 6,233,135, 6,094,788, 6,059,847, 5,907,472, 5,862,035, 5,777,428, 5,621,607) disclose a method for plasma spraying aluminum onto a carbon cloth electrode such that the aluminum penetrates the fiber tows of the cloth, thereby decreasing the resistance of the electrode. The aluminum/carbon composite electrodes are bonded to aluminum foil current collectors via application of pressure at elevated temperatures (360° C.-600° C.). In these and the other cases above, a liquid or vapor phase metal is sprayed onto the surface of a nonconforming electrode, such as a carbon cloth. In other words, the metal conforms to the electrode cloth before it is solidified. The purpose for this is primarily to decrease the internal electrode resistance.

Laminating or sintering the electrode to the current collector is another method of reducing ESR. An adhesive may be used to adhere the electrode to the current collector with pressure so that the electrode is fixed to the current collector. Also, thermoplastics may be used as binders in the electrode so that when the electrode is pressed onto the current collector with heat and pressure the thermoplastic will melt and stick to the current collector. Polytetrafluorethylene (PTFE) may also be used to adhere the electrode to the current collector. When colloidal suspensions of PTFE are used as the binder for active carbon electrodes, the rolled flattened electrode sheet may be rolled simultaneously with a sheet of metal (aluminum) foil to which it will adhere.

Currently available EDLC devices packaged in the coin cell configuration which are not manufactured using the typically expensive processes discussed above have relatively high ESR values compared to wound, or "jelly roll" devices. Coin cell packages are desirable in applications were energy density is important because they tend to have a higher energy density than wound devices. However, coin cell electric double layer capacitors typically use thicker (greater than approximately 200 µm) electrodes than typically found in capacitors made using wound electrodes. The increased electrode thickness contributes to a higher ESR. Wound EDLC's typically have much lower ESR values than coin cells, in part because of their thinner (less than approximately 200 µm) electrodes.

Currently available commercial supercapacitors made in a coin cell type package claim ESR values in the range of 30-200 ohms, the majority being above 75 ohms. Supercapacitors with these values are usually constructed of two separate supercapacitor coin cells connected and packaged in series and have rated voltages of 5.5V. Because resistance is additive ($R_T=R_1+R_2$) with devices in series the ESR value for an individual supercapacitor making up the series pair will be half of this range, or 15-100 ohms. In contrast, jelly-roll capacitors typically have an ESR ranging from 0.03-0.5 ohms.

Thus there exists a need for coin cell capacitors having reduced internal electrode-current collector resistance, and thus lower ESR, that are amenable to low-cost manufacturing.

SUMMARY OF THE INVENTION

Disclosure of the Invention

The present invention is a coin cell capacitor comprising two current collectors configured to form a coin cell capacitor, a porous electrode, and a porous metal disc in electrical contact with one of the current collectors and at least partially embedded in a surface of the electrode, wherein during manufacture the electrode was sufficiently locally deformable to be imprinted by a surface pattern of the disc. The porous metal disc preferably comprises expanded mesh. At least one of the current collectors is preferably at least partially coated with a conductive material, preferably comprising aluminum. The porous metal disc is preferably coated with a conducting adhesive. The electrode preferably comprises carbon powder, or optionally comprises an aerogel.

The present invention is also a device for storing and delivering power to a load, the device comprising a battery and the aforesaid coin cell capacitor for charging the battery and delivering power to the load. The device preferably further comprises a charge switching module. The battery preferably charges the capacitor.

The present invention is also a method of making a coin cell capacitor, the method comprising the steps of adhering porous metal to an interior surface of a coin cell capacitor current collector, disposing a locally deformable porous electrode on the porous metal, and embedding at least a portion of the porous metal into a surface of the electrode. The method preferably further comprises the step of coating the interior surface with a conductive material comprising aluminum prior to the adhering step. The method preferably further comprises the step of coating the porous metal with a conducting adhesive prior to the adhering step. The disposing and embedding steps are optionally performed prior to the adhering step. The method preferably further comprises the step of flattening the porous metal prior or subsequent to the disposing step. The method preferably further comprises the step of punching the porous metal to produce a porous metal disc. The porous metal preferably comprises expanded mesh.

The present invention is also a second method of making a coin cell capacitor, the method comprising the steps of disposing an aerogel precursor on and within at least a portion of a porous metal sheet, reacting the precursor to form an aerogel electrode comprising the porous metal sheet embedded in a surface the aerogel punching a disc from the aerogel and porous metal sheet, and adhering the disc to an interior surface of a coin cell capacitor current collector. The method preferably further comprises the step of coating the interior surface with a conductive material comprising aluminum prior to the adhering step. The reacting step preferably comprises performing pyrolysis at a temperature lower than the melting temperature of the porous metal sheet.

An object of the present invention is to provide a coin cell capacitor having low equivalent series resistance.

An advantage of the present invention is that where space is constrained, higher energy density can be achieved without high equivalent series resistance and without expensive and hard to manufacture components.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS

Best Modes for Carrying Out the Inventions

MicroPower Chip

The system of the present invention, described herein as the MicroPower Chip (or pPowerChip), is a compact long lifetime power source which will enable the implementation of many applications, including but not limited to wireless network systems, that will no longer require battery changes or replacement. The MicroPower Chip preferably comprises several components including energy storage (including but not limited to batteries and supercapacitors), energy harvesting and/or generation sources including but not limited to vibrational (piezoelectric, capacitive or inductive), thermal (thermoelectric), radioisotope (betavoltaic), solar (photovoltaic), fuel cells, microcombustion, or biochemical sources, and ultra-low power electronics for charging of energy storage devices, power conditioning, rectification, power management, monitoring state of charge and voltage step-up. The MicroPower Chip may be configured using different combinations of the above components depending on the intended application. The energy harvesting component will generate power from the ambient environment, which is then stored in the energy storage components. The ultra-low power electronics control how this power is used or delivered. The MicroPower Chip can be packaged in many common form factors (battery sizes such as AA, AAA, C, D, 9V, etc) as well as custom sizes and will be capable of plugging directly into a wireless system/component, just like a battery, in order to provide a long lifetime power source.

The MicroPower Chip preferably combines energy harvesting, energy storage in (for example) batteries and supercapacitors, and ultra-low power electronics to condition the output from the harvester and carefully charge the storage devices. Batteries (or microbatteries) may provide back-up energy to accommodate periods without ambient energy, while supercapacitors or (microsupercapacitors) provide unrivalled power delivery capabilities to handle high and/or pulsed loads. The electronics circuitry is designed to draw only a very small portion of the harvested energy so that the remainder may be directed for storage, as described above, or for immediate use by the system it is powering. Furthermore, once it is fully charged, the microbattery can optionally be switched out of the circuit to serve as a back-up source, and the energy generated by the harvester can be used to power the application load (i.e., sensor) and accommodate any charge leakage in the supercapacitor.

Because it is harvesting energy from its environment, the present invention provides a long-lived energy source, far out-lasting conventional batteries. The system may be designed to have a custom form factor or to fit a standard battery configuration, including but not limited to AA, AAA, 9V, Li123, C, D, and others, so it can be used in systems already configured for these types of batteries with little to no modification of the customer's system. The present invention may alternatively be packaged like an integrated circuit, for example in a Dual-in-Line package (DIP) or a standard outline IC (SOIC) for direct mounting on a printed circuit board (PCB).

Figure 1:
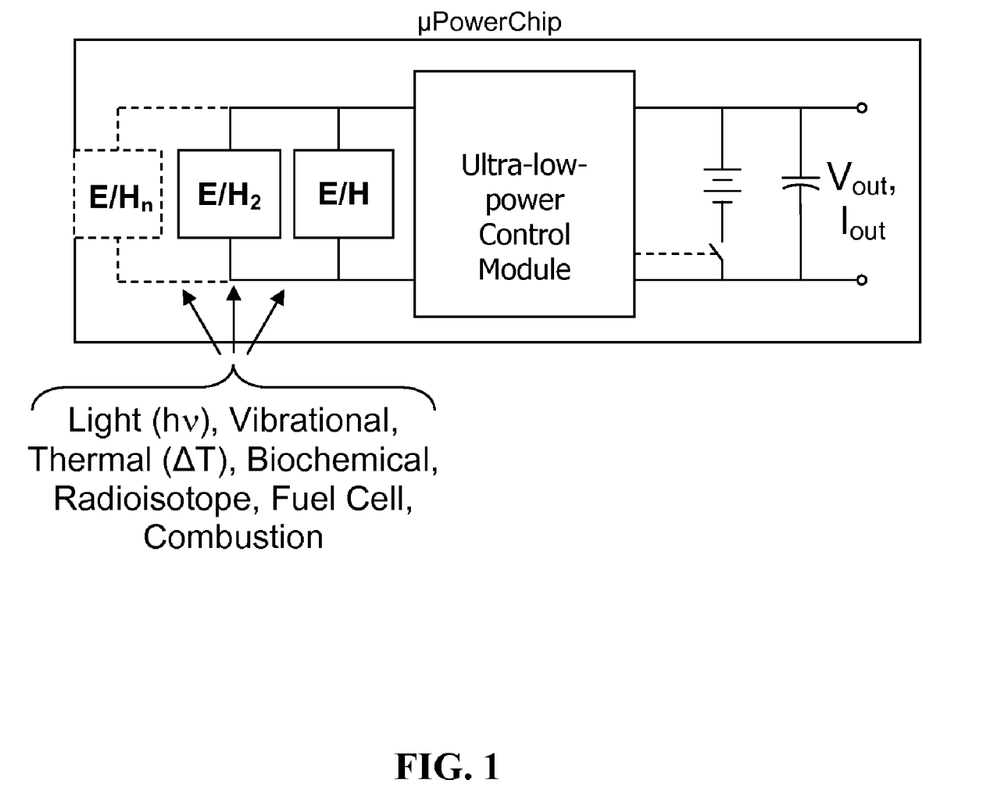
FIG. 1 is a schematic diagram of the MicroPower Chip of the present invention.

FIG. 1 shows a broad schematic of the MicroPower Chip, which preferably consists of three parts: energy harvesting and/or generation (E/H), energy storage, and control electronics to rectify the input power (if necessary) and safely charge the storage devices. Energy generation and/or harvesting may be accomplished using a hardware component which is capable of converting ambient energy (vibrations, solar, heat, chemical, etc.) into electrical energy. These methods include but are not limited to vibrational (including piezoelectric, electrostatic and inductive methods), thermal (thermoelectric, P3), solar (various forms of photovoltaics), radioisotope, biochemical, fuel cell, microturbines, adenosine triphosphate (ATP) converters (ATP is a biomolecule able to store and transport chemical energy within cells), magnetic, electromagnetic (or r.f.) induction (EMI), and microcombustion. The MicroPower Chip may contain one or more pieces of the same type of energy harvesting hardware (for example two vibration harvesters) or contain a combination of two or more pieces of hardware capable of different types of energy harvesting (for example one piece of hardware harvests vibrational energy while another piece of hardware harvests thermal energy). Using two or more energy harvesting components would allow for higher levels of available power and/or decrease the likelihood that the system would be subjected to periods of time with no harvestable ambient energy.

Figure 2:
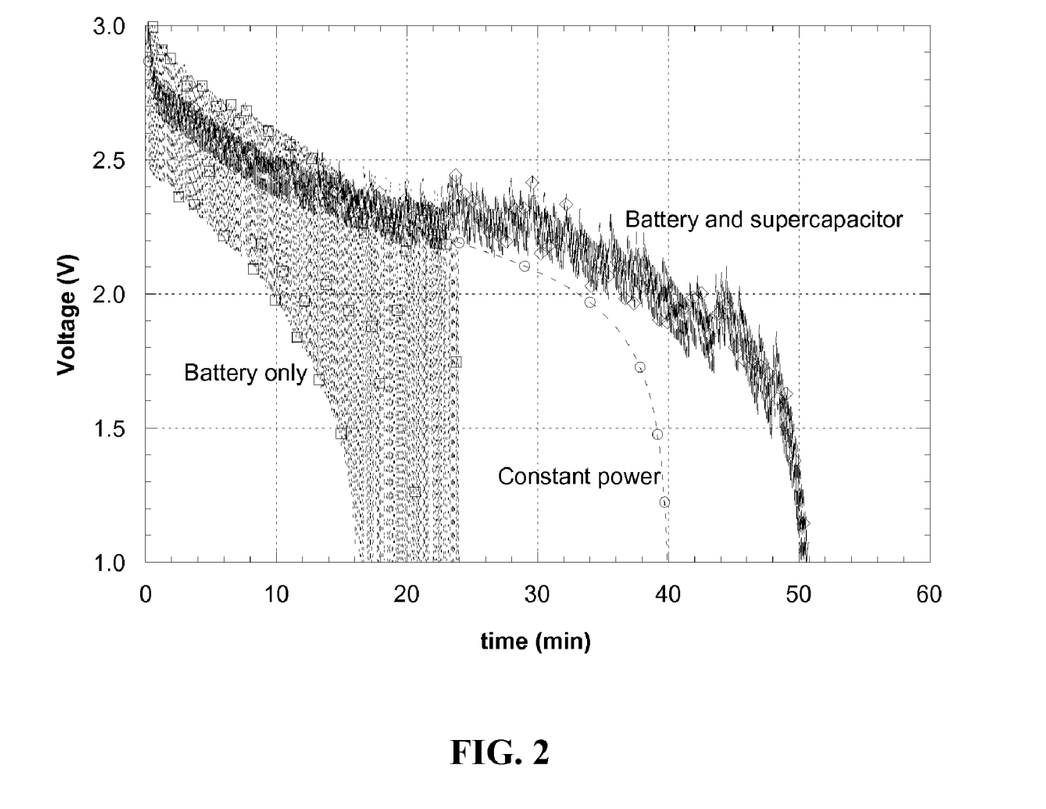
FIG. 2 is a comparison of battery discharge under i) pulsed load, ii) continuous averaged load, and iii) pulsed load with supercapacitor.

Energy storage is preferably accomplished using a secondary (rechargeable) battery (including but not limited to lithium-ion, lithium polymer, thin film lithium ion, nickel metal hydride (NiMH), and nickel/cadmium (NiCd)) and/or a supercapacitor (also known as an ultracapacitor or electrochemical double layer capacitor (EDLC), comprising, for example, aqueous or organic based electrolyte chemistries and symmetric or asymmetric types). The energy storage components of the present invention preferably store the energy generated by the harvester for use at a later time. The different characteristics of batteries and supercapacitors make them suitable for different functions of energy storage and delivery. If the energy must be stored for a long time, and released slowly, for example as back-up in case there is no harvestable ambient energy (e.g., at night when the energy harvester is a solar cell), a battery would be the preferred energy storage device. If the energy must be delivered quickly, as in a pulse for a radio frequency (RF) communication module, but long term storage is not critical, a supercapacitor would be sufficient. The system can employ i) a battery (or several batteries) alone, ii) a supercapacitor (or supercapacitors) alone, or iii) any combination of batteries and supercapacitors appropriate for the application of interest. Improvements in materials, construction, etc. for lithium ion and some lithium polymer batteries are resulting in devices that are capable of delivering pulsed loads as well as steady state loads. These devices may be capable of fulfilling both back up and pulse load delivery functions. However, as shown in FIG. 2, in order to maximize the life of the battery separate devices preferably fulfill these functions.

The present invention preferably utilizes volumetric microbatteries and microsupercapacitors, but it is not limited to these devices. Readily available COTS devices could be used for energy storage, although they are generally large compared with the rest of the system, and require inordinately long time to charge/recharge. Moreover, some novel thin film batteries exist, both as research devices and commercial products (e.g., Oak Ridge Micro and PowerPaper). These devices tend to have high discharge rate (high power) capability, but their capacity values on a per unit area basis are low, meaning that large footprint devices are needed to meet useful energy storage capabilities. For certain applications, these devices may prove to be appropriate. One embodiment of the present invention may combine a volumetric microbattery for energy back-up with a thin film microbattery in place of the microsupercapacitor to provide pulse power.

Figure 3:
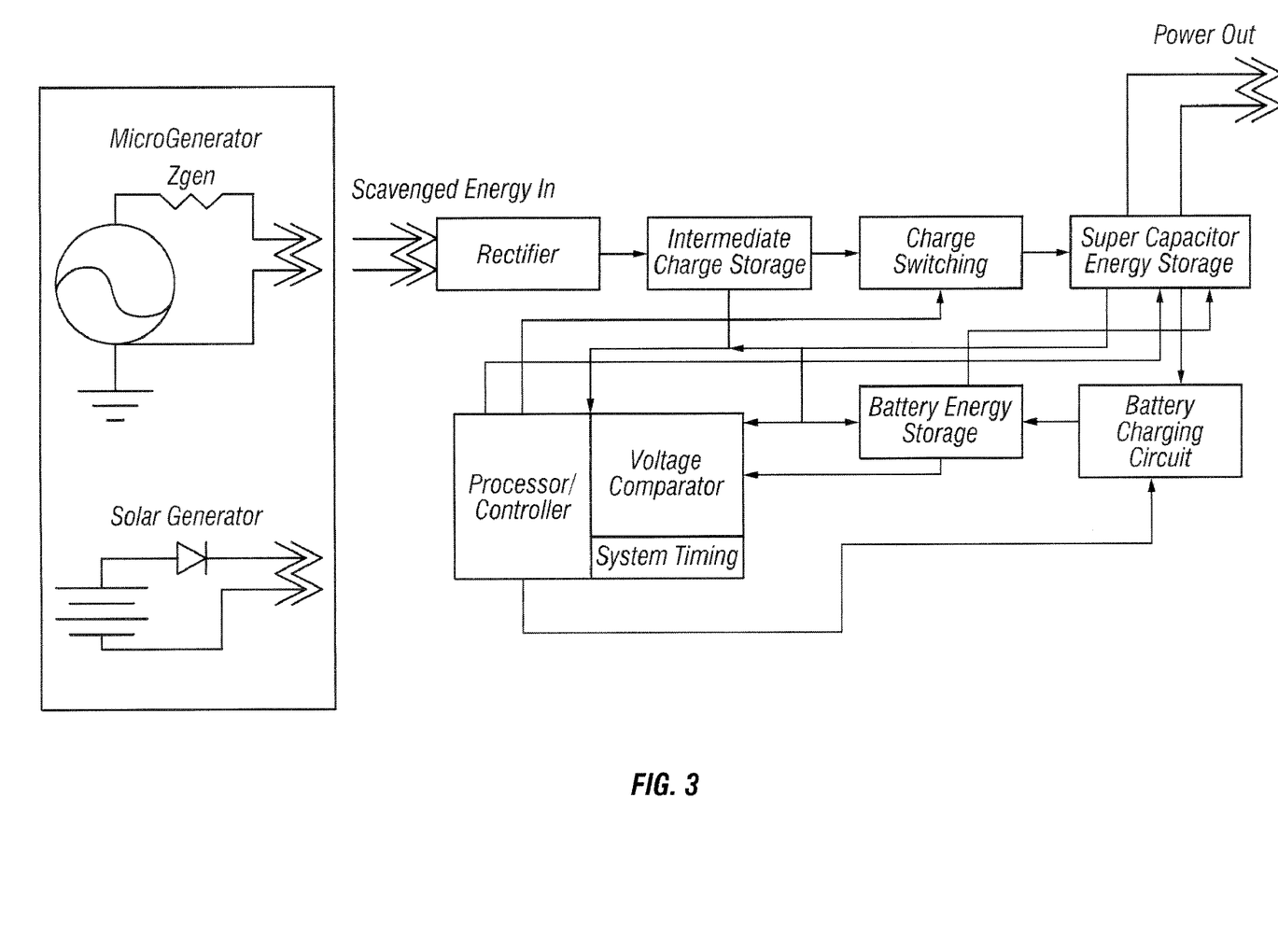
FIG. 3 is a block diagram of MicroPower Chip control electronics.

FIG. 3 shows a more detailed block diagram of the device. The circuitry will operate for both AC (e.g., vibration, rotational) and DC (e.g., solar, thermal) sources. An incoming AC signal is rectified preferably using low forward-bias-voltage diodes to minimize losses. These may be silicon Schottky diodes, germanium p-n diodes or other specially engineered components. The control electronics circuitry primarily fulfills two functions: determining how the energy generated by the energy-harvesting component is to be directed (either to storage or directly to the system the MicroPower Chip is powering or both) and safely and efficiently charging the energy storage devices without overloading, overcharging, or otherwise damaging them or the generator. These circuits are preferably designed to consume very little of the incoming power. Small scale energy harvesters that are of interest for use in wireless sensors and other microsystems generally deliver low levels of power (a few hundred microWatts at most). It is critical that the charging and power management circuitry delivers as much of that power as possible to the energy storage or the sensor device rather than consuming it in its own operation.

The circuitry preferably primarily consists of two modules, a charge-switching module for charging a supercapacitor energy storage device and a battery charging circuit, controlled by an ultra-low power microcontroller. Energy for the microcontroller operation is preferably stored in an intermediate energy storage device, for example a conventional capacitor (typically a few $\mu F$ to a few hundred $\mu F$). Initially, a supercapacitor may be charged via the charge-switching module. The charge switching module is designed primarily for two purposes: first, to prevent irreversible damage to the supercapacitor(s) by carefully controlling their charging in order to avoid overcharging them. Second, connecting a supercapacitor directly to a generator delivering voltage V will draw a current I equal to V/ESR, where ESR is the equivalent series resistance of the supercapacitor (typically a few Ohms, ideally $<<1\Omega$). As a low ESR is a desirable characteristic of supercapacitors for power delivery, the capacitor would draw a high instantaneous current, overloading the generator (energy harvester). Since the MicroPower Chip may sit on the shelf for some time before being deployed, it is not possible to store the supercapacitor in the charged state, and so this current control is preferable to prevent damaging the generator on initial deployment.

Once it is fully charged, the supercapacitor then preferably serves as an energy "cache" for charging the battery. A typical charge procedure for Li-Ion batteries involves two stages. First, a constant current charge increases the battery voltage until a target voltage (for example 4.2V), preferably monitored by the microcontroller, is reached. This stage usually delivers about 70% of the total capacity of the battery. The battery is then trickle-charged at a constant voltage. Charging is typically terminated once the current level falls below about 10% of the initial charging current.

By employing a microcontroller that operates at extremely low power, various functions or conditions of the MicroPower Chip can be periodically monitored both during the charging cycles and during operation. Examples of what may be monitored include the state of charge of both the battery and supercapacitor and whether or not the generator is producing power. Once the battery is fully charged it may be removed from the circuit so that the MicroPower Chip provides power to the sensor via the generator (harvester) and supercapacitor only. If the microcontroller detects that the generator has ceased to provide power (i.e., in darkness for a solar cell, or in the case that ambient vibrations cease), then the microcontroller will preferably switch in the battery to provide back-up power. In this case, the battery would preferably trickle charge the supercapacitor and provide quiescent power to the sensor until the ambient energy source is restored. The battery is preferably designed to be able to store sufficient energy to provide back-up power for the entire time the system is anticipated to be without ambient energy. This time would vary for different applications, but could range from a few hours to several days or weeks. In the event that the stored energy in the battery drops below a predetermined level, a low battery condition can be communicated to the sensor, allowing the sensor to shut down, or go into a power conservation mode, for example.

Figure 4A:
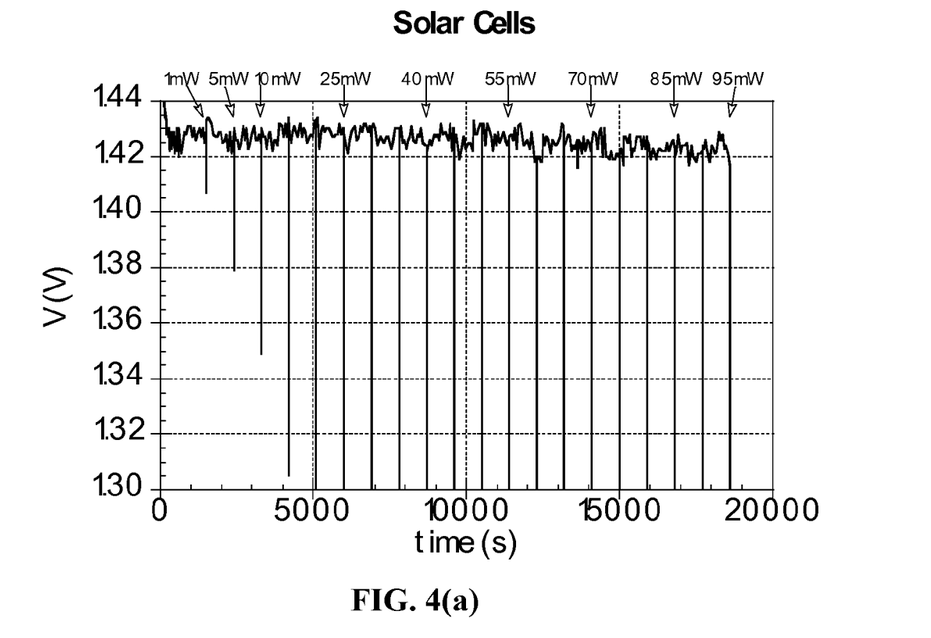
FIG. 4(a) is a graph showing solar cell output voltage under increasing pulse loads.
Figure 4B:
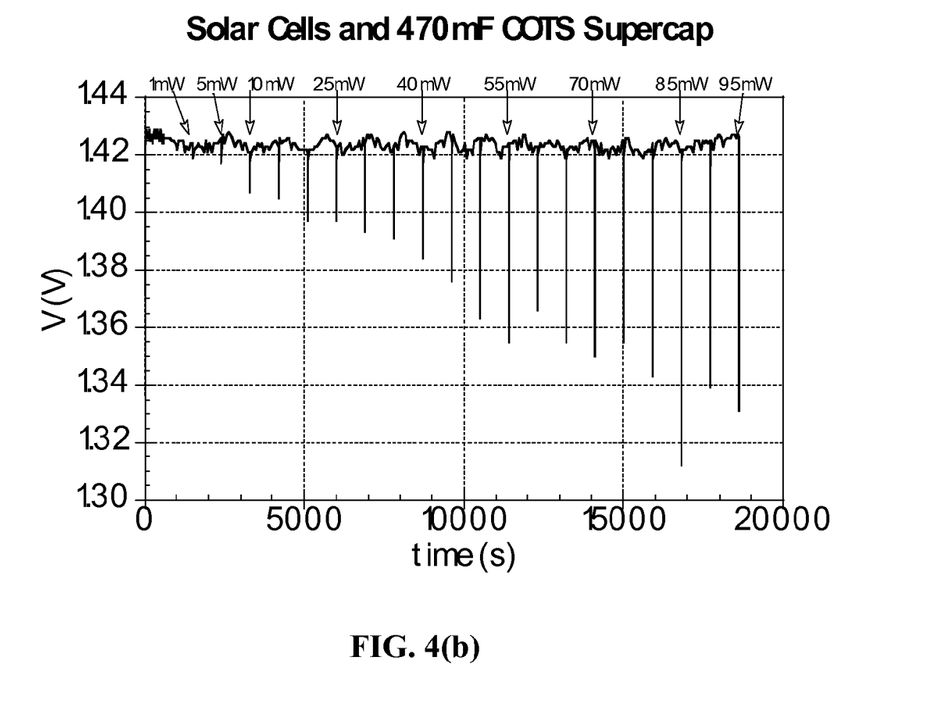
FIG. 4(b) is a graph showing the output voltage from a solar cell and supercapacitor in parallel.
Figure 4C:
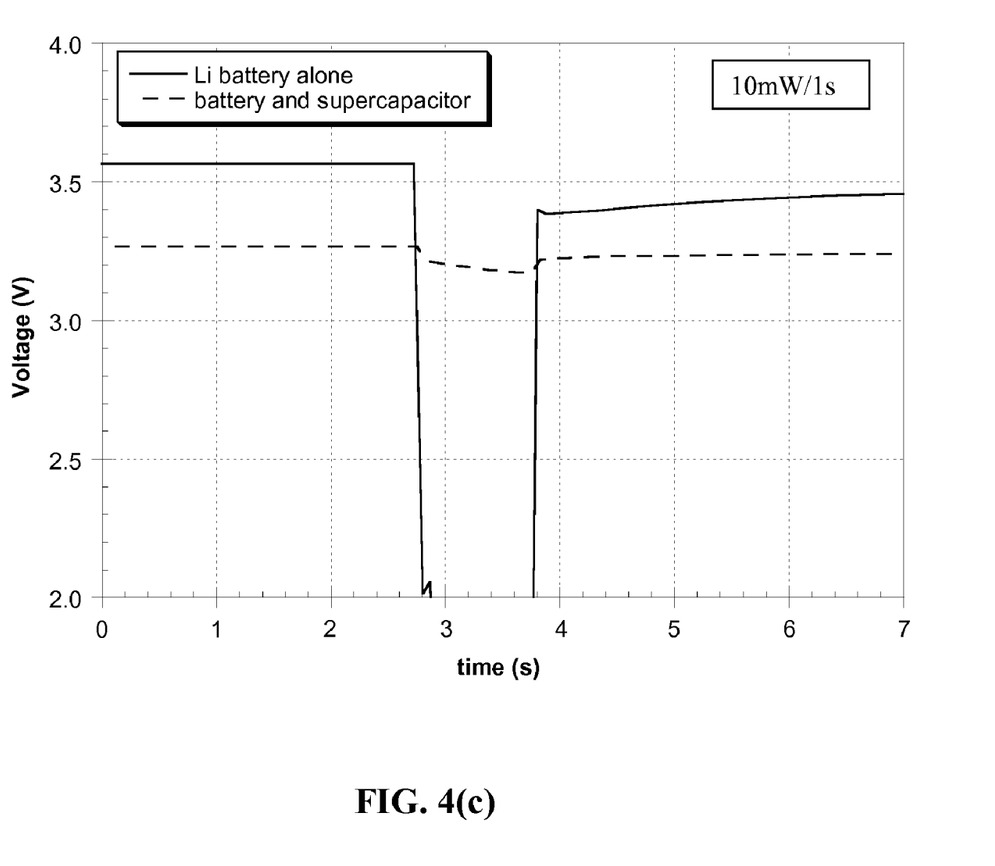
FIG. 4(c) is a graph comparing voltage droop under load for a lithium battery and a lithium battery and supercapacitor in parallel.

Finally, load current delivery is determined solely by the internal resistance of the different devices. For high power pulse loads, most of the energy would be delivered by the supercapacitor because its ESR is significantly lower than that of the energy harvester or the battery (see FIG. 4). For steady state operation, the energy harvester (or the battery if there is no energy from the generator) preferably delivers energy to power the load, trickle charge the supercapacitor, and compensate for the supercapacitor's internal leakage.

The features, advantages and benefits of the present invention, listed in Table 1, address concerns that manufacturers and end users of wireless sensors and other applications have identified as critical to adoption of this kind of technology. For example, while not having to change batteries periodically is desirable for many wireless sensor applications, the vulnerability of energy harvesting to a lack of ambient energy (e.g., darkness for solar cells) is also concern for many users. The present invention addresses this and other concerns at low cost.

ESR. Coin cell capacitors of the present invention may be used with the MicroPower Chip of the present invention, as discussed above, or alternatively may be used separately or in other applications.

Figure 5:
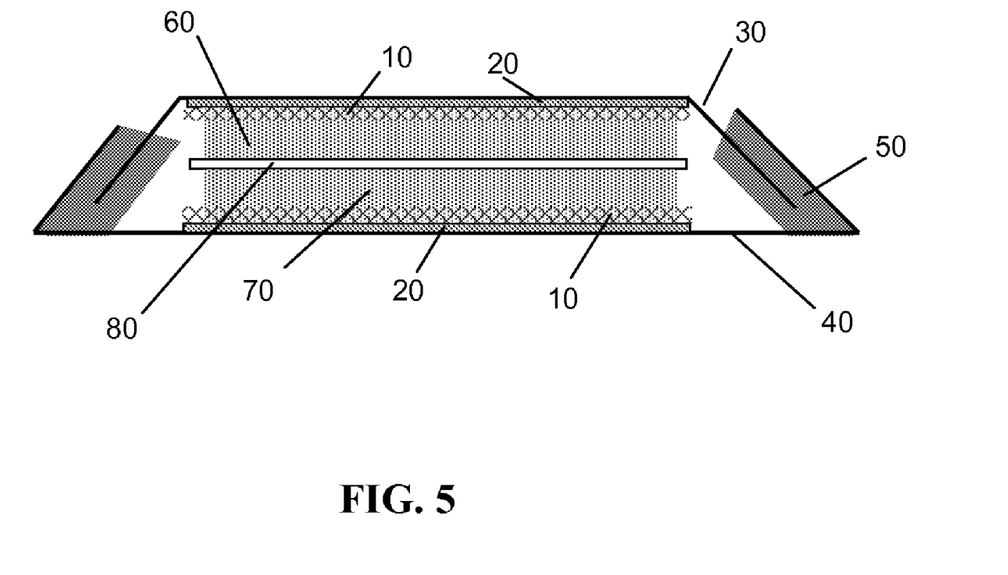
FIG. 5 is a schematic of an embodiment of a coin cell capacitor of the present invention.

An embodiment of the present invention, schematically shown in FIG. 5, preferably comprises expanded metal foil or mesh 10 adhered to one or both of the current collectors, preferably via conductive adhesive 20. The current collectors preferably comprise lid 30 and case 40 of the device, which are preferably separated by gasket 50. The device also preferably comprises two electrodes 60, 70 which are separated by separator 80. Commercially available EDLC devices use conductive adhesives, but only to glue the electrode directly to the current collector without mesh. This does reduce the ESR but not to the same extent as the present invention. By preferably adhering the mesh to the current collector with conductive adhesive, the ESR of the EDLC is significantly reduced by lowering the contribution of the interfacial contact resistance between the electrode and the current collector. The ESR of a coin cell capacitor of the present invention is preferably less than approximately 15 ohms, more preferably less than approximately 5 ohms, even more preferably less than approximately 2 ohms, and most preferably less than approximately 1 ohm.

Because in this configuration the mesh may be considered a component of the current collector, its utilization effectively increases the surface roughness or area of the current collector, creating more contact surface area with the electrode, thus reducing the interfacial contact resistance with the electrode. When the coin cell capacitor is assembled, compression is typically placed on the porous electrodes, preferably forcing the mesh into the surface of the electrode a distance that is determined by the thickness of the mesh. Although the use of expanded metal mesh is preferable, any porous or other high

TABLE 1

Features, advantages and benefits of μPowerChip ™ for wireless sensors.

| Feature | Advantage | Benefit |
| --- | --- | --- |
| Harvests ambient energy | No need to change batteries, recharge, or refuel | Reduced system maintenance costs |
| Provides steady state, pulse and back-up power | Enables cold start, offers redundancy in the case of ambient energy failure, and efficiently delivers pulse power | Reduces system vulnerability and system size |
| Small form factor | Can be designed into standard or custom shapes | Can be plugged in to customers' existing products |
| Flexible source of input energy | Similar products can be used in different applications with little reengineering | Flexible, broad product line that can be used in different environments - e.g., industrial, commercial, and residential |

Low ESR Coin Cell Capacitors

As used throughout the specification and claims, "coin cell capacitor" means a capacitor, supercapacitor, microcapacitor, microsupercapacitor, an EDLC, or the like, that comprises a coin cell, button cell, or similar "stacked" configuration and not a jelly roll, or wound, configuration. The present invention comprises a coin cell capacitor, preferably comprising an EDLC, having a reduced ESR approaching that of wound devices. Thus small area/volume, higher energy density coin cell capacitors can be used instead of wound devices without the voltage drop associated with currently available high ESR coin cell EDLCs. Thus for applications where space is constrained, higher energy density can be achieved without high surface area material may be substituted for the mesh, including but not limited to foams, fibers, sintered powders, wire mesh, or aerogels.

The coin cell case and lid may be made of any metal that is suitable for manufacturing coin cell parts, but typically comprise stainless steel. The inside of the coin cell case and lid, which comes into contact with the active components of the EDLC, may optionally be plated or clad with an appropriate metal (such as aluminum), alloy or other conductive material in order to further reduce the ESR of the device. This material preferably has a low resistance and is electrochemically compatible with the internal components, such as the electrolyte, electrodes and/or separator. The coating or cladding may comprise, for example, aluminum, aluminum alloys, nickel, titanium, tantalum, and/or stainless steel. In one embodiment, an Al coating not only improves current collector stability but also the interfacial contact resistance, since stainless steel has a higher resistivity than aluminum. The coating may be applied using any technique known in the art, including but not limited to cladding, plating, sputtering, chemical vapor deposition, physical vapor deposition, flame spraying, and arc spraying. The coin cell case and/or lid may alternatively comprise aluminum or any of the coating materials described above, in which case a coating may not be necessary or desirable.

Mesh 10 preferably comprises aluminum metal but can be made of any other metal or conductive material suitable (i.e. having the appropriate electrochemical compatibility) for EDLC devices. For example, for organic supercapacitors, the mesh preferably comprises aluminum, although other metals such as stainless steel, titanium, tantalum, nickel and the like, which are electro-chemically stable towards the electrolyte, may optionally be used. Metals or metal alloys having low bulk resistivities are most desirable.

Figure 7:
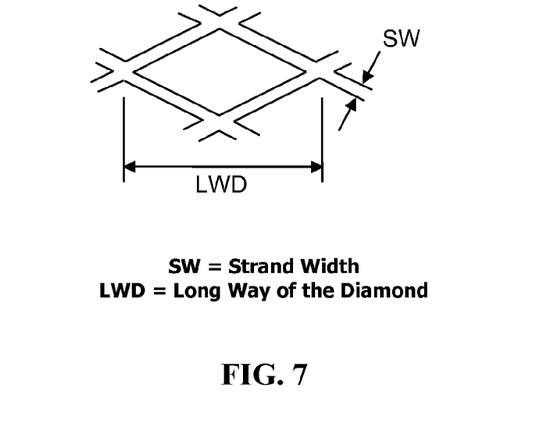
FIG. 7 is an illustration of mesh parameters typically important to mesh selection.

Certain dimensions of the mesh, including but not limited to the material thickness, the strand width and the length of the long way of the diamond (LWD), are preferably optimized. FIG. 7 illustrates how the strand width and long way of the diamond are defined. Expanded metal foil, mesh or grid is typically made by forming slits in the metal foil that penetrate completely through the material. The foil is then stretched or expanded in the direction perpendicular to the direction of the slits so that the slits are pulled open, forming the diamond shaped holes. The spacing between adjacent slits typically determines the strand width while the length of the slit and the amount the foil is expanded typically determine the LWD dimension. Any mesh may be employed, for example mesh of the type manufactured and sold by Dexmet Corporation of Branford, Conn. Because the mesh is typically not flat after the expansion process, it is preferably rolled in a rolling mill. This typically results in a smooth, shiny surface. The mesh is then preferably coated with a conductive adhesive/coating mixture, which preferably increases the surface roughness of the mesh itself before it is adhered to the current collector.

Mesh 10 can be bare, surface treated, and/or coated with a conductive paint or adhesive. Aluminum mesh is preferably chemically treated by immersing in a bath of 5% potassium hydroxide (KOH) or sodium hydroxide (NaOH) in water for several minutes. This is preferably followed by a 30 second rinse with de-ionized water and immersion in a 1% hydrochloric acid (HCl) bath for 30 seconds. The mesh is then preferably rinsed with de-ionized water and dried. The mesh is then optionally coated with a layer of the conductive adhesive and allowed to dry. The conductive adhesive preferably has good chemical resistance to any electrolyte used in the coin cell capacitor. In addition, the bulk resistivity of the dried and/or cured adhesive is preferably low so as not to increase the interfacial resistance between the mesh and the electrode. Metals other than aluminum may be chemically treated using other methods suitable to those particular materials. The purpose of chemical treatment is in part to remove surface oxides and or other impurities that may be present from the manufacturing process.

The strand width is preferably sufficiently narrow so that when the electrodes are compressed during the coin cell assembly process the mesh is pushed into the electrode surface. Strand widths that are too wide typically will create too much resistance against the electrode and will not penetrate into the electrode very effectively, and thus do not substantially improve ESR reduction. The strand width is preferably in the range of approximately 0.001"-0.010" (25-250 microns), and is preferably approximately 0.005" (125 microns). The LWD dimension is preferably chosen so that it is large enough to provide reduced resistance for the mesh to penetrate into the electrode. The LWD is preferably in the range of approximately 0.020"-0.134" (508-3404 microns), and is more preferably approximately 0.077" (1955 microns). The mesh thickness is preferably in the range of approximately 0.002"-0.010" (51-254 microns) depending on the thickness of the electrode, the strand width and the long way of the diamond dimension. The preferred thickness is approximately 0.004" (200 microns). In general, the thickness of the mesh is preferably approximately 5%-50%, and more preferably approximately 10%-30%, of the thickness of the electrode.

The "softness" of the electrode determines how well a certain mesh configuration will penetrate into it. For example, a mesh with a wider strand width and or a shorter LWD dimension can potentially be used with a softer electrode composition. For a firmer electrode composition, a mesh with a narrower strand width and or a larger LWD dimension may be preferred. The diameter of the mesh disc is preferably slightly greater than or equal to the diameter of the electrodes used.

This invention may utilize any electrode composition, including but not limited to those made of carbon powders, such as those comprising activated carbon and conductive carbon fillers. The carbon powder typically has a high surface area (800-3000 meter$^2$/gram) with readily accessible pores and is of high purity. The particle size of the carbon powder is preferably in the range of 2-30 microns. The carbon powder is typically mixed with a binder to facilitate the formation of an electrode structure that possesses mechanical integrity. The binder can comprise any polymer and preferably maintains particle-to-particle contact, gives the electrode mechanical integrity, and allows stable, low-resistance bonding to a current. Polytetrafluoroethylene (PTFE, Teflon®) and polyvinylidene difluoride (PVDF) are two candidate binder materials that are inert to the electrolyte, stable at the electrochemical potential of the electrodes, effective at low concentrations, and coat only a small fraction of the surface of the activated carbon. The carbon powder and the binder are mixed using a suitable solvent in a mixer. The binder content is typically in the range of 2-10 weight percent, and preferably in the range of 3-6 weight percent. The solvent is then removed from the carbon binder mixture so that the electrode may be formed. The carbon binder mixture is then pressed, or rolled or calendered in a rolling mill using a plastic film as a carrier. The size of the gap in the rolling mill determines the thickness of the finished electrode.

Commercially available PTFE-carbon composite electrode materials such as those sold by W. L. Gore & Associates (e.g., Excellerator) may also be used. Rather than comprising continuous fiber tows, carbon powder electrode sheets can deform around any protrusions on the current collector, such as the mesh of the present invention. In this way, good electrical contact is made to the current collector, reducing the contact resistance contribution to the device ESR.

Alternatively, an electrode may be formed in-situ using a fluid precursor such as sol-gel derived carbon aerogels. Aerogels are typically formed through the aqueous polycondensation of resorcinol (1,3 dihydroxybenzene) with formaldehyde. This reaction under alkaline conditions proceeds through a sol-gel transition and results in the formation of a highly crosslinked polymer. Precursors are typically resorcinol and formaldehyde, but other precursors can be used such as the phenol-furfural or melamine-formaldehyde systems. The reaction of resorcinol with formaldehyde occurs with a molar ratio of 1:2, and sodium carbonate ($Na_2CO_3$) catalyst to form an organic resorcinol-formaldehyde gel (RF gel) with water in the pores. After exchanging the residual water with acetone, the solvent is extracted under $CO_2$ supercritical conditions to form a nanoporous aerogel that can be converted to a monolithic carbon aerogel via pyrolysis of the organic precursors under inert or reducing conditions. The mesoscopic structure is conserved upon pyrolysis, and the resultant porous material is black in color with a high surface area (600-800 $m^2/g$), and an interconnected particle morphology. If necessary, carbon aerogels can be activated under $CO_2$ at elevated temperature in order to increase the accessible nanoporosity. The overall process can be tailored to deliver aerogels with a particular, surface area, pore size and pore size distribution.

In order to form an aerogel electrode for EDLCs, the gel can be cast in-situ around, or over, the mesh. The pyrolysis steps have to be carefully controlled in order not to exceed the melting temperature of the mesh. In the case of Al mesh, this means 600° C.; however noble metals, such as Pt are able to withstand much higher temperatures (>1000° C.).

Several types of electrolytes are used in electrical double layer capacitors and may be used in conjunction with the present invention. These are generally categorized as aqueous, organic and ionic fluid electrolytes. Aqueous electrolytes are based on water as the solvent and limit operation of supercapacitors to approximately 1.0V due to electrochemical break down of water. Common aqueous electrolytes contain either potassium hydroxide (KOH) or sulfuric acid ($H_2SO_4$). Organic electrolytes are based on organic solvents and typically have a higher operating voltage window than aqueous electrolytes, operating in the range of 2-3V. Common salts used in organic electrolytes include, but not limited to, are Tetraethylammonium Tetrafluoroborate (TEATFB) and Triethylmethylammonium Tetrafluoroborate (TEMATFB). Ionic fluids or liquids are molten salts in the liquid form and are composed entirely of ions. These fluids do not require the addition of salts, have a higher voltage operating window and typically may be used at much higher temperatures than organic solvent based electrolytes.

Figure 6:
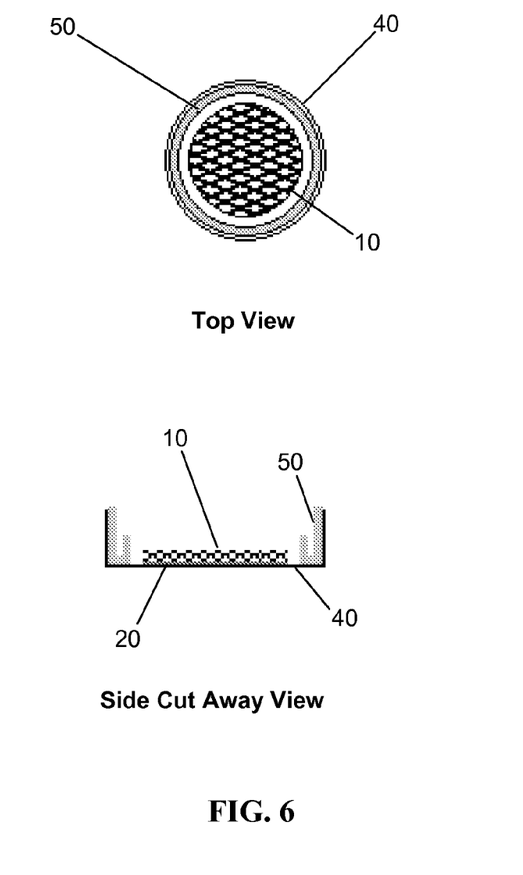
FIG. 6 shows schematic top and cutaway side views of metal mesh positioning before other components are added during manufacture of the capacitor of FIG. 5.

FIG. 6 depicts an intermediate stage of a method of manufacturing one embodiment of the coin cell capacitor of the present invention. Mesh 10 is preferably punched into a disc having the desired diameter, and then one disc is disposed on case 40 (and, similarly, one is disposed on lid 30, not shown) of the coin cell before the electrodes, separator and lid are added. The mesh is preferably adhered to the metal current collector (e.g. case and/or lid) so as to provide intimate contact between the two components. The adhesive preferably comprises a conductive adhesive, such as EB-012 from Acheson, that also has good chemical compatibility with the electrolyte. Adhering the mesh to the current collector also allows for handling of the coin cell parts without the mesh being displaced during the assembly process. The mesh is preferably temporarily clamped in place while the conductive adhesive dries (or is cured) to ensure that it lies flat and makes good contact with the current collector. An optimal amount of conductive adhesive is preferably employed: applying too much adhesive may at least partially fill the holes in the mesh, resulting in ineffective penetration of the mesh into the electrode, while applying too little adhesive may result in the mesh not sticking adequately to the current collector. The other internal components are then preferably disposed on the case, and the lid is then preferably crimped to the case. Before or during the crimping process, pressure is preferably applied to the coin cell capacitor approximately normal to the electrodes, thereby forcing the mesh to penetrate at least partway into the electrodes. The electrodes thus accommodate or conform to the profile of the mesh. In other words, the electrode material fills the diamond shaped holes in the mesh after the mesh penetrates into the surface of the electrode. As discussed above, in addition to a powder, any form of electrode that can accommodate the solid mesh may be used, for example a liquid, foam, or gel. In one such example, the mesh may be embedded in a gel comprising a precursor, which is then dried, solidified or otherwise reacted to form a substantially solid electrode that has the mesh embedded in one of its surfaces.

A second embodiment of the assembly method is to attach the coated (or uncoated) mesh to the electrode before the mesh or the electrode is punched; the two are then subsequently punched simultaneously (co-punched). This is preferably accomplished by rolling the coated (or uncoated) mesh and the electrode sheet together, one on top of the other in direct contact, in a rolling mill to force the mesh into one surface of the electrode. The electrode preferably conforms to the profile of the mesh, effectively embossing it into the surface of the electrode. The resulting mesh/electrode composite preferably has sufficient mechanical integrity to enable handling it and discs to be punched from it.

EXAMPLES

Several experiments were carried out using different thicknesses of 10.3 mm diameter commercial electrode materials (W. L. Gore & Associates, Elkton, Md.) electrodes in aluminum plated 2016 coin cells (Table 2), without the use of mesh. The coin cell parts comprised 316 stainless steel (SS), which is not electrochemically compatible with acetonitrile (AN) based electrolytes, and so were coated with a pinhole-free film Al (~10 µm). (Propylene carbonate (PC) was also used as a solvent for some electrolytes.) The Al coating protected the SS current collector from the AN-based electrolytes. The effectiveness of the Al coating was demonstrated by determining that ESR values of Al-coated CC supercapacitors using an AN-based electrolyte were unchanged after several thousand cycles, while un-coated SS coin cell parts could not withstand a single cycle without corrosion of the current collector. These experiments indicate that varying electrode thickness had little influence on ESR reduction.

TABLE 2

Effect of electrode thickness on ESR.

| Electrode Thickness | ESR (Ω) | | C (mF) | |
| --- | --- | --- | --- | --- |
| (µm) | PC | AN | PC | AN |
| 290 | 2.90 | 1.47 | 1000 | 1050 |
| 400 | 2.99 | 1.58 | 1440 | 1420 |
| 500 | 2.56 | 1.32 | 1795 | 1750 |

In contrast, the data in Table 3, performed on 500 micron thick electrodes, shows that a significant reduction in ESR occurs for larger diameter electrodes.

TABLE 3

Effect of electrode diameter on ESR.

| Electrode Diameter | ESR (Ω) | | C (mF) | |
| --- | --- | --- | --- | --- |
| (mm) | PC | AN | PC | AN |
| 8.1 | 4.05 | 2.03 | 1075 | 1030 |
| 10.3 | 2.56 | 1.32 | 1795 | 1750 |
| 15.25 | 1.39 | 1.15 | 3778 | 3689 |

Significant improvement in ESR of the coin cell supercapacitors was achieved with the addition of mesh as is described herein. Table 4 presents results from selected examples of the modification method to illustrate the performance improvement that can be realized. These data indicate that 10-40% decrease in ESR value can achieved, depending on which electrolyte is used in the experiments.

TABLE 4

Effect of use of mesh on ESR.

| Electrolyte | C (mF) | ESR without mesh (Ω) | ESR with mesh (Ω) |
|---|---|---|---|
| 1.0 M TEATFB in PC | 2150 | 2.1 | 1.9 |
| 1.0 M TEATFB in AN | 2062 | 1.1 | 0.85 |
| 1.0 M TEATFB in 50:50 PC/AN | 2056 | 1.7 | 1.0 |

Further testing was performed using 2016 coin cells with an internal cavity dimension (thickness) of 0.043" (1.1 mm). Data for all tests reported here are the average results from four separate coin cells assembled using components of the same size and configuration. The exposed surface of the internal cavity of the non-plated coin cells was SS316L. The exposed surface of the plated coin cells was a 0.0003" (7.6 um) thick layer of pure aluminum which was deemed pin hole free.

The mesh, used in all tests unless otherwise mentioned, was 0.004" thick, with a SW of 0.005" and an LWD of 0.050". One mesh disc was used for each electrode. The mesh was coated and adhered in place with conductive adhesive The composition of the electrodes for all tests was the same and comprised a commercially available material that was 500 microns thick. The material was received as a 4" wide roll. The electrodes were punched using a round hand punch. The electrodes were infiltrated with the electrolyte by soaking them before supercapacitors were assembled.

Two electrolytes were used for these sample tests. They are a 1M solution of the salt Tetraethylammonium Tetrafluoroborate (TEATFB) in the solvent Propylene Carbonate (PC) or a 1M solution of the salt Tetraethylammonium Tetrafluoroborate (TEATFB) in the solvent Acetonitrile (ACN).

The equivalent series resistance (ESR) was determined using a test system manufactured by Arbin Instruments.

TABLE 5

Comparison of plated versus non-plated coin cell capacitor components.

| | Electrode Diameter (mm) | Electrolyte | ESR (Ω) |
|---|---|---|---|
| Non-Plated 2016 Coin Cell | 8.1 | 1M TEATFB in PC | 5.14 |
| Plated 2016 Coin Cell | 8.1 | 1M TEATFB in PC | 4.05 |
| Plated 2016 Coin Cell | 8.1 | 1M TEATFB in ACN | 2.03 |

TABLE 6

Comparison of ESR obtained with and without mesh for Al-plated 2016 coin cell capacitors.

| Electrode Diameter (mm) | Mesh | Electrolyte | ESR (Ω) |
|---|---|---|---|
| 8.1 | No Mesh (One 0.008" Thick Aluminum Spacer For Compression) | 1M TEATFB in PC | 11.8 |
| 8.1 | Mesh | 1M TEATFB in PC | 4.05 |

TABLE 7

Effect of electrode diameter on ESR for Al-plated 2016 coin cell capacitors.

| Electrode Diameter (mm) | Electrolyte | ESR (Ω) |
|---|---|---|
| 8.1 | 1M TEATFB in PC | 4.05 |
| 10.32 | 1M TEATFB in PC | 2.56 |
| 15.25 | 1M TEATFB in PC | 1.39 |

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A coin cell capacitor comprising:
   two current collectors configured to form a coin cell capacitor;
   a porous electrode; and
   a porous metal disc in electrical contact with one of said current collectors and at least partially embedded in a surface of said electrode;
   wherein during manufacture said electrode was sufficiently locally deformable to be imprinted by a surface pattern of said disc.

2. The coin cell capacitor of claim 1 wherein said porous metal disc comprises expanded mesh.

3. The coin cell capacitor of claim 1 wherein at least one of said current collectors is at least partially coated with a conductive material.

4. The coin cell capacitor of claim 3 wherein said conductive material comprises aluminum.

5. The coin cell capacitor of claim 1 wherein said porous metal disc is coated with a conducting adhesive.

6. The coin cell capacitor of claim 1 wherein said electrode comprises carbon powder.

7. The coin cell capacitor of claim 1 wherein said electrode comprises an aerogel.

8. A device for storing and delivering power to a load, the device comprising a battery and the coin cell capacitor of claim 1 for charging said battery and delivering power to said load.

9. The device of claim 8 further comprising a charge switching module.

10. The device of claim 8 wherein said battery charges said capacitor.

* * * * *